(12) United States Patent
Bishop et al.

(10) Patent No.: US 11,565,932 B2
(45) Date of Patent: *Jan. 31, 2023

(54) REMOTE SUBSEA HOSE POSITION MONITORING

(71) Applicant: Dunlop Oil & Marine Ltd., Pyewipe (GB)

(72) Inventors: Simon Bishop, Beverley (GB); Paul Staton, Grimsby (GB)

(73) Assignee: Dunlop Oil & Marine Ltd., Pyewipe (GB)

( * ) Notice: Subject to any disclaimer, the term of this patent is extended or adjusted under 35 U.S.C. 154(b) by 399 days.

This patent is subject to a terminal disclaimer.

(21) Appl. No.: 16/750,152

(22) Filed: Jan. 23, 2020

(65) Prior Publication Data

US 2020/0156926 A1 May 21, 2020

Related U.S. Application Data

(63) Continuation-in-part of application No. PCT/EP2019/065432, filed on Jun. 13, 2019.

(30) Foreign Application Priority Data

Jul. 31, 2018 (EP) .................................... 18186477
Sep. 18, 2018 (EP) .................................... 18194969
Jun. 13, 2019 (WO) ................. PCT/EP2019/065432

(51) Int. Cl.
| | |
|---|---|
| *B67D 9/00* | (2010.01) |
| *F16L 1/15* | (2006.01) |
| *F16L 1/20* | (2006.01) |
| *F16L 1/24* | (2006.01) |
| *G05D 7/06* | (2006.01) |

(Continued)

(52) U.S. Cl.
CPC .............. *B67D 9/00* (2013.01); *B63B 22/021* (2013.01); *B63B 27/34* (2013.01); *F16L 1/15* (2013.01); *F16L 1/20* (2013.01); *F16L 1/24* (2013.01); *G05D 7/0676* (2013.01); *H04B 13/02* (2013.01);

(Continued)

(58) Field of Classification Search
CPC ......... B67D 9/00; B63B 22/021; B63B 27/34; F16L 1/15; F16L 1/20; F16L 1/24; F16L 11/133; F16L 1/11; E21B 41/0007
See application file for complete search history.

(56) References Cited

U.S. PATENT DOCUMENTS

| | | |
|---|---|---|
| 3,664,283 A | 5/1972 | Chaney |
| 3,980,038 A | 9/1976 | Dashew et al. |

(Continued)

FOREIGN PATENT DOCUMENTS

| | | |
|---|---|---|
| WO | 2012066031 A1 | 5/2012 |

*Primary Examiner* — Carib A Oquendo
(74) *Attorney, Agent, or Firm* — Gregory Adams; David L. Cate

(57) ABSTRACT

A system for fluid transfer is disclosed and includes a floatable buoy, an underwater hose, a plurality of underwater node units and circuitry. The underwater hose has a first end coupled to the floatable buoy and a second end. The plurality of underwater node units distributed along the length of the underwater hose and configured to generate positioning signals. The circuitry is configured to determine a relative distance between each of the plurality of undersea node units based on the generated positioning signals to generate a plurality of relative distances.

20 Claims, 10 Drawing Sheets

(51) Int. Cl.
*H04B 13/02* (2006.01)
*B63B 22/02* (2006.01)
*B63B 27/34* (2006.01)
*E21B 41/00* (2006.01)
*F16L 11/133* (2006.01)

(52) U.S. Cl.
CPC ......... *E21B 41/0007* (2013.01); *F16L 11/133* (2013.01)

(56) References Cited

U.S. PATENT DOCUMENTS

| | | | |
|---|---|---|---|
| 6,485,343 B1 | 11/2002 | Borseth | |
| 6,932,127 B2 | 8/2005 | Samuelsen et al. | |
| 9,546,540 B2 | 1/2017 | Taylor | |
| 2003/0084960 A1* | 5/2003 | Fontenot | B63B 22/00 141/387 |
| 2010/0178819 A1* | 7/2010 | Straume | B63B 21/04 441/5 |
| 2013/0109258 A1* | 5/2013 | Coombs | B63B 27/34 441/5 |
| 2013/0266381 A1* | 10/2013 | Pettersen | B63B 27/24 405/224.2 |
| 2016/0245945 A1* | 8/2016 | Rokkan | G01V 1/3808 |

* cited by examiner

REMOTE SUBSEA HOSE POSITION MONITORING

RELATED APPLICATIONS

This application is a continuation of European Patent application EP 18186477.8 filed on 31 Jul. 2018, European Patent application EP18194969.4 filed on 18 Sep. 2018 and of PCT application PCT/EP2019/065432 filed on 13 Jun. 2019, the contents of which are hereby incorporated by reference.

FIELD

The field to which the disclosure generally relates floating and subsea hoses used to transport liquids.

BACKGROUND

Subsea and floating hose transport systems are often used in conjunction with an oil platform or an oil rig. In this process, the produced oil is first conveyed from a tanker to the drilling platform via an underwater hose to the buoy. As soon as the capacity of the tanker is depleted, the floating hose is detached from the tanker again so that the tanker can continue on. The floating buoy together with the floating hose remains on the sea. However, it can take several hours or even several days before a new tanker is connected to the floating hose. This is especially true in very rough seas.

The location of the end of the hose may be difficult to find for a tanker due to a lack of location information.

What is needed are techniques to facilitate positioning and location of floating hoses and subsea/underwater hoses.

DETAILED DESCRIPTION

Figure 1:
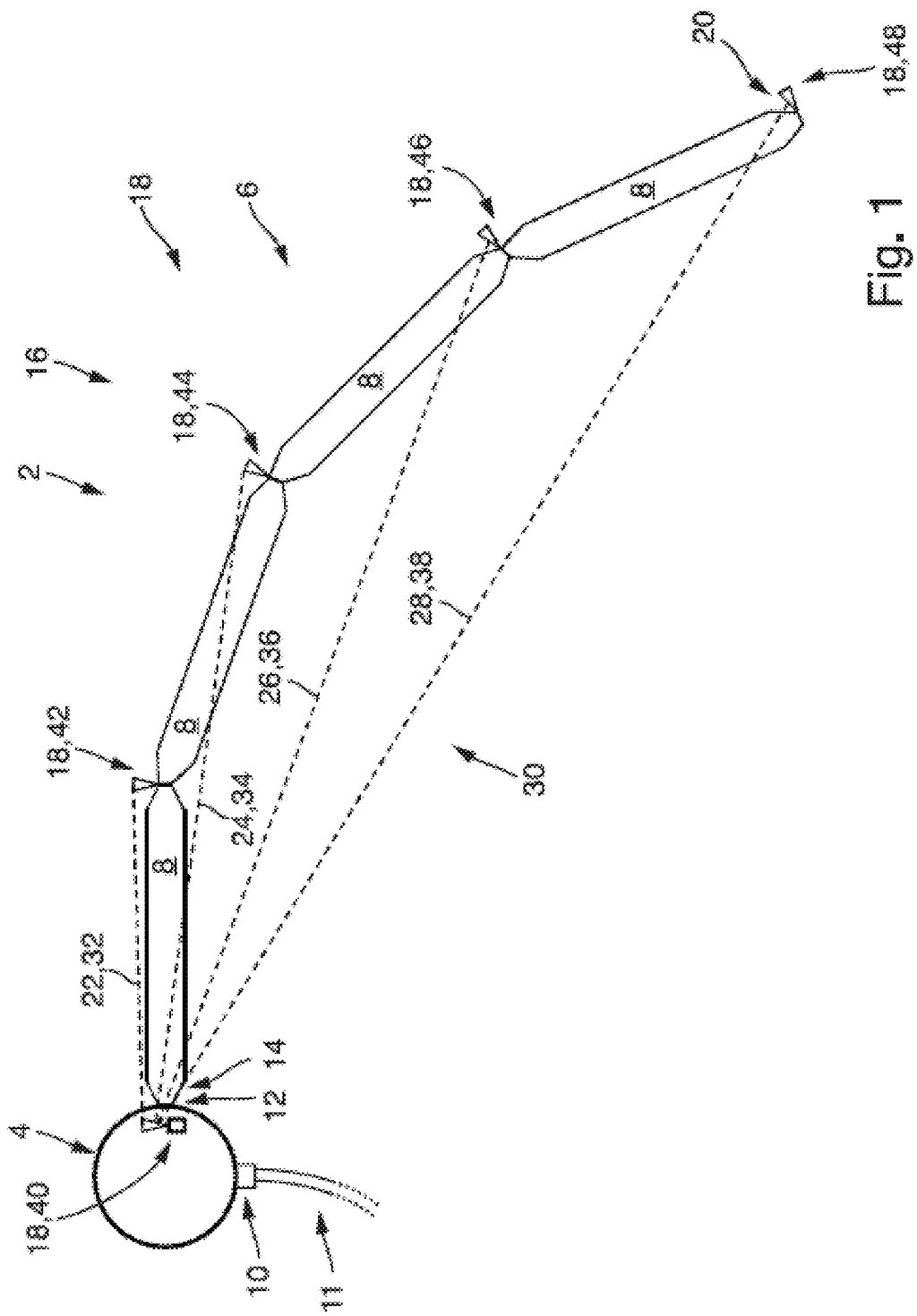
FIG. 1 shows a design of the system in a schematic view.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Oil transport systems have a buoy and a floating hose. The floating hose is also buoyant. Such systems are often used in conjunction with an oil platform or an oil rig. In this process, the produced oil is first conveyed from the drilling platform via an underwater hose to the buoy and from there via the floating hose to a tanker. The tanker can take the oil. As soon as the capacity of the tanker is reached, the floating hose is detached from the tanker again so that the tanker can call at a port. The floating buoy together with the floating hose remains on the sea. However, it can take several hours or even several days before a new tanker is connected to the floating hose. This is especially true in very rough seas. Especially in this case, a free end of the floating hose can be driven around by the water. In an unfavorable case, it may even happen that the free end of the floating hose rests on another piece of the floating hose and thus forms a loop. When a new tanker approaches such a system floating in the sea, the new tanker can usually only determine on site whether the free end of the floating hose is not arranged to cross over to another section of the floating hose and/or in which direction the free end of the floating hose is arranged in relation to the buoy. Both of the above information are important for the approach of the new tanker in order to avoid a collision with the buoy and/or the floating hose and to allow the free end of the floating hose to be coupled to the new tanker as quickly as possible. In order to collect this information, the tanker usually approaches the buoy at low speed, using optical sighting devices, such as binoculars, the crew on the tanker observes where the floating hose is located and in which direction the floating hose is directed towards the buoy. Based on this, the following maneuver is planned for the tanker so that the tanker can be coupled to the floating hose. In the unfavorable case, however, several hours may pass before the correct anchor position for the tanker can be selected and/or adopted. This applies in particular if a free end of the floating hose is arranged to cross over to another section of the floating hose. This is because before the floating hose is coupled to the tanker, it must first be ensured that the floating hose does not cross over. To this end, assistance ships are called in and/or lowered from the tanker to remove the crossing of the floating hose. Due to the corresponding delay, however, high costs are incurred, which should be avoided.

A system with a buoyant buoy and a floating hose is disclosed, whereby the system ensures and/or supports a simple delay-free and reliable coupling of the floating hose to a tanker.

In one embodiment, a system with a buoyant buoy and a floating hose is therefore planned. The floating hose is a buoyant hose. The system is therefore also floatable. The floating hose has a plurality of buoyant hose segments that are coupled together in series. This allows a common fluid channel to be formed by the floating hose or several hose segments, which is designed to conduct a fluid such as oil. The buoy has a liquid inlet connector designed for connection to an underwater hose. In addition, the buoy has a fluid outlet connection that is connected to a first end of the buoyancy tube, so that the buoyancy tube is arranged in a geometrical arrangement to the buoy. A plurality of node units are attached to the buoyancy tube and preferably the buoy in such a way that the node units are distributed between the buoy and a second end of the buoyancy tube. Each node unit is designed by means of an associated radio unit to establish a radio connection to each of at least two of the other radio units of the respective node units, so that a radio network, in particular a mesh radio network, is created. In addition, each node unit is designed to determine a relative distance to each other node unit connected via a radio link based on the respective radio link. At least one of the node units forms a main unit which is designed to collect the relative distances determined by the other node units via the radio links and/or the radio network. Based on the collected relative distances, the main unit is designed to determine location data representing the geometric arrangement of the floating hose relative to the buoy. The main unit also has a radio transmitter unit that is designed to transmit a location signal representing the location data.

Via the location signal provided by the system, the system offers the advantage that even before a tanker arrives at the system, the buoy can be closed via the geometric arrangement of the floating hose relative to the buoy. The location signal is used to transmit location data representing the geometric arrangement of the floating hose relative to the buoy. Based on this location data, it can therefore be determined whether the floating hose is basically in an arrangement that allows the floating hose to be easily and reliably coupled to a tanker. This may be the case, for example, if the buoyancy tube is geometrically arranged without a loop to the buoy, for example if the buoyancy tube is oriented away from the buoy without loops and/or kinked sections. The radio transmitter unit can be integral with or separate from the radio unit of the main unit. For example, the location signal can be transmitted wirelessly, i.e. by radio. The radio transmitter unit of the main unit can be designed for this purpose. The location signal can be transmitted continuously and/or at discrete intervals and/or periodically. The location signal can be received by a receiver that is on land, assigned to a satellite or located on the tanker. Each of the options mentioned offers the advantage that the geometric arrangement of the floating hose relative to the buoy can be determined well before the tanker arrives. If in an unfavorable case a loop is formed by the floating hose, measures can be taken to remove the loop before the arrival of the tanker. For example, a smaller vessel can go to the system equipped to free the buoyancy tube from the loop so that the buoyancy tube is arranged without loops to the buoy. This allows a simple and reliable connection of the floating hose to the tanker.

The floating hose is designed as a buoyant hose. The floating hose can also be called a floating hose line. Thus, both the buoy and the floating hose of the system are buoyant. The same therefore applies to the system as such. By buoyant is understood preferably the ability to swim in water, especially seawater. This may result in the buoy and/or the floating hose remaining independently above the surface of the water, at least in sections. The floating hose has a plurality of buoyant hose segments. Each of the hose segments is designed in the manner of a hose as such and/or a hose section. Each hose segment can have coupling elements at the two associated ends, which are designed so that several hose segments can be coupled together in series. The floating hose preferably has a fluid channel designed to carry liquid, such as oil, which is formed jointly by the hose segments. The hose segments are preferably coupled together in such a way that the liquid can be led through the liquid channel without loss.

The liquid inlet connection is preferably located at the bottom of the buoy, so that an underwater hose can be connected to the liquid inlet connection. This is preferably a hose designed to carry liquid, especially oil. This hose is also called "Undersea pipeline". The underwater hose may therefore be designed to provide a fluid connection between the buoy's fluid inlet connection and an oil rig or oil platform. The buoy also has a liquid outlet connection. The liquid outlet port may have a direct and/or switchable fluid connection with the liquid inlet port. This can be designed to carry liquid from the liquid input port to the liquid output port. Where the connection is switchable, for example by a valve, a flow of liquid from the liquid input port to the liquid output port can be controlled, in particular by allowing the valve to open or preventing the valve from closing.

A geometric arrangement can be understood as a spatial structure and/or a spatial arrangement. The geometric arrangement can be determined and/or represented by the spatial coordinates, for example in a plane, of the floating tube in relation to the buoy. Alternatively or in addition, the geometric arrangement may be determined and/or represented, for example, by spatial coordinates, preferably in a plane, of the hose segments relative to the buoy. The geometric arrangement may, alternatively or in addition, also refer, for example, to the spatial position and/or spatial orientation of the floating hose and/or hose segments in relation to the buoy. The geometric arrangement of the floating hose relative to the buoy can therefore provide information on how, where and/or in which geometric shape the floating hose is arranged relative to the buoy. In order to provide the information about the geometric arrangement of the floating hose relative to the buoy to a receiver, such as a radio signal receiving unit and/or a data processing unit on the tanker or a land station, the main unit is designed to determine location data representing the geometric arrangement of the floating hose relative to the buoy based on collected relative distances. The relative distances preferably refer to the distances between the node units and/or the distances from the main unit to each other node unit. If the direct distances between the nodal units along the floating hose are not stored by the main unit, the relative distances between the nodal units, which are also calculated as the direct distances, can be taken into account when determining the location data. Otherwise, the stored distances between the node units can also be taken into account when determining the location data. The direct distances mentioned above refer in particular to the distance between adjacent node units along the floating hose. The relative distances that can be determined by means of the radio links can preferably refer to the relative distances between the main unit and each of the other node units. Using this data, it is possible to geometrically map how the geometric arrangement of the floating hose is relative to the buoy.

To determine the relative distances, the node units have radio units. By means of the radio units, radio connections can be established so that a radio network, in particular a mesh radio network, is created. Radio signals can be exchanged via the radio connections. The radio signals have a propagation time between transmission and subsequent reception. The radio signals can therefore be used to determine the distance between the corresponding radio units. The node units are trained for this purpose. The radio links are therefore used in particular to determine the relative distances between the node units or the associated radio units. Preferably, the node units are configured so that the relative distances determined are exchanged via the radio links of the radio network. It may also be provided that each radio unit is configured in such a way that the relative distances are determined by triangulation on the basis of the transit times of the signals exchanged via the radio links. Each of the node units can therefore be designed and/or designated as an electronic node unit. Each of the node units is permanently or detachably connected to the system. Thus all or at least some of the node units can be connected to the floating hose in a fixed or detachable manner. However, it is also possible that at least one of the node units is connected to the buoy. It may also be provided that one of the node units is connected to exactly one of the hose segments of the floating hose at a time. However, it is also possible that the node units are arranged in such a distributed manner that every second or every third hose segment is connected to one of the node units. Other distributions of the node units can also be provided. For clarification it should be mentioned that the floating hose has two ends. Between the ends, the floating hose forms the preferred fluid channel, which is preferably designed as a fluid channel. The first end of the floating hose is therefore preferably opposite the second end of the floating hose in the direction of the hose. The first end of the buoyancy tube is connected to the buoy's liquid outlet connection. The connection can be designed in such a way that liquid can be fed from the liquid outlet connection into the fluid channel of the floating hose. This is particularly useful if oil is to be transported from an oil rig to a tanker via an underwater hose, the liquid inlet connection, the liquid outlet connection and the floating hose.

An example design of the system is characterized by the fact that each hose segment is at least indirectly connected to at least one of the node units. Each hose segment can therefore have at least one node unit that is connected to the respective hose segment. Therefore, at least one node unit can be permanently connected to each of the hose segments and/or assigned to the respective hose segment. The connection and/or attachment can be at least indirect. For example, the node units can be fixed between the hose segments, in particular by means of screw connections on the connecting flanges of the hose segments, by which two adjacent hose segments are detachably connected to each other. By assigning and/or connecting at least one node unit to each hose segment, the geometric arrangement of the floating hose to the buoy can be determined particularly precisely over the relative distances.

Another example design of the system is that each hose segment comprises one of the node units. Thus each node unit can be attached to exactly one of the hose segments and/or form part of the respective hose segment. Each node unit can therefore be assigned to exactly one hose segment. The assignment of a node unit to a hose segment offers the advantage that the exchange of a hose segment can simultaneously cause an exchange of the node unit. This makes the repair of a floating hose particularly easy.

Another example design of the system is that the node unit of each hose segment is attached to the lateral outer surface of the respective hose segment. In this way, the respective node unit can be attached to the outer surface of the respective hose segment with a frictional and/or material connection. It is preferred that the node units are designed to be watertight.

Another example design of the system is that the node unit of each hose segment is embedded in a jacket wall of the respective hose segment. This allows the respective node unit to be effectively protected from external environmental influences. This is especially true if the jacket wall has rubber material in which the respective node unit is embedded. Due to the rubber material the respective node unit can also be protected against water. In other words, the respective node unit can be sealed watertight by the rubber material. The rubber material also provides impact protection. This is because the rubber material can absorb mechanical shocks, which increases the durability of the node unit.

Another example design of the system is that the buoy comprises the main unit so that the main unit is connected to the buoy. The main unit may require more space and/or a more powerful power supply. This can be ensured by means of the buoy, as the buoy often offers more space than each of the hose segments. In addition, a battery and/or a solar cell may be placed on the buoy, which is designed to supply the main unit with electricity. The arrangement of the main unit on the buoy is therefore advantageous.

Another example design of the system is that each of the node units has a battery that serves as the electrical supply for the respective node unit. The battery may be a rechargeable battery. It may also be provided that each of the nodal units, in particular the main unit, has no other means of power supply. This allows the node units to be particularly compact. Finally, a battery as an energy source ensures that the node units can be used particularly independently.

Another example design of the system is characterized in that the main unit comprises a navigation unit adapted to receive a satellite-based wireless navigation signal, wherein the navigation unit is configured to determine a geographical buoy location of the buoy based on the navigation signal, and wherein the main unit is configured to supplement the location data such that the location data also represents the geographical buoy location. The geographical location of the buoy may refer to geographical coordination of the buoy. The geographical location of the buoy allows the identification of the absolute, not only relative, geographical positions of the buoy and thus of the system. The navigation signal can be sent from several satellites, so that the navigation unit determines the geographical location of the buoys by triangulation and/or from the transit times of the navigation signals. The navigation unit is preferably designed for this purpose. As the location data can represent the geometric arrangement of the floating tube relative to the buoy as well as the geographical location of the buoy, the location data allow an exact information about the location of the buoy and the arrangement of the floating tube relative to the buoy. Corresponding location data can be represented by the location signal that can be transmitted wirelessly by the transmitter unit of the main unit.

An example design of the system is characterized by the fact that one of the hose segments includes the main unit, so that the main unit is connected to this hose segment, which is called the main hose segment. With regard to the advantageous explanations, preferred features, advantages and/or effects as explained in connection with the main unit, reference is made by analogy to the previous discussions of the main unit for the hose segment mentioned above.

A further example design of the system is characterized by the fact that one of the node units, which is at least indirectly connected to one of the hose segments, in particular the main hose segment, comprises a further navigation unit which is designed to receive a further satellite-supported wireless navigation signal, wherein the further navigation unit is configured to determine a geographical hose location of the respective hose segment based on the further navigation signal, wherein the radio units are configured to exchange the geographical hose location by means of the radio links and/or the radio network, and wherein the main unit is configured to expand the location data so that the location data also represents the geographical hose location. The location data can therefore represent, for example, the geographical position of the floating hose relative to the buoy, the geographical buoy location and the geographical hose location. In this case, the location data provide particularly precise information on where and how the buoy and the floating hose are arranged. It may be provided that the node unit of each hose segment is designed in the same way as the previous, explained example of the hose segment.

Another example design of the system is that the radio transmitter unit is designed for wireless transmission of the location signal to a satellite receiver and/or to a receiver installed stationary on land. Alternatively or in addition, the radio transmitter unit may be designed for wireless transmission of the location signal to a receiver on a ship, in particular a tanker. This allows the arrangement of the floating hose relative to the buoy and the geographical position of the system to be monitored remotely.

One example design of the system is that each hose segment has a length of at least 7.5 meters or at least 10 meters. The same may apply to the node units, which are distributed between the buoy and the second end of the buoyancy tube. This means that the node units arranged in a row one after the other can each have a distance of at least 7 meters or 9.5 meters between them. The distances of the node units can also correspond to the lengths of the hose segments. For example, the distances between the nodal units arranged in series can be at least 7.5 meters or at least 10 meters. The distances between immediately successive node units along the floating hose from the buoy to the second end of the floating hose can be stored by the main unit. In this case, it is not necessary that the distances mentioned are recorded as relative distances by means of the radio links.

A favorable design of the system is characterized in that each node unit is designed to transmit and receive reference signals via the radio links, and wherein each node unit is designed to determine the relative distances with an accuracy of at least 85%, preferably at least 95%, based on the reference signals. For example, if the reference signal is transmitted from one node unit to another node unit 20 meters away, it is particularly preferable that the distance between the two node units be determined with a deviation of maximum 3 meters, preferably maximum 1 meter. Especially preferred is an accuracy of 97%. In this case the maximum deviation is 0.6 meters.

Another example design of the system is characterized in that the node units are adapted to update the determined relative distances at predetermined time intervals, wherein the main unit is configured to update the location data based on the updated relative distances, and wherein the radio transmitter unit is configured to transmit the location signal with updated location data after each update of the location data. For example, the relative distances may be scheduled to be updated every 30 minutes. The location data is then updated, which in turn results in the transmission of the location signal representing the updated location data. This allows continuous monitoring of the arrangement of the floating hose relative to the buoy.

Further features, advantages and possible applications of the present invention result from the following description of the design examples and the figures. All described and/or pictorially represented features, on their own and in any combination, constitute the subject-matter of the invention, also independently of their composition in the individual claims or their withdrawals. The same reference signs for the same or similar objects continue to appear in the figures.

FIG. 1 shows system 2 with a buoy 4 and a buoyant floating hose 6. The floating hose 6 is formed by a number of floating hose segments 8. The hose segments 8 are connected to each other in a row one behind the other in such a way that the floating hose 6 is formed by the hose segments 8 with a continuous, common fluid channel extending from a first end 14 of the hose 6 to a second end 20 of the hose 6. With the first end 14 the floating hose 6 is coupled to a liquid outlet connection 12 of the buoy 4 in such a way that liquid can flow from the liquid outlet connection 12 into the liquid channel of the floating hose 6.

System 2 is used to swim on the sea. System 2 is therefore a buoyant system. It can swim on water. The same applies to each hose segment 8 or to the floating hose 6 as well as to the buoy 4. The buoy 4 can be connected to an underwater hose 11 by means of a fluid inlet connection 10, which is only shown in sections and schematically in FIG. 1. Via the underwater hose 11, liquid, in particular oil, can be conveyed from a drilling platform to the buoy or the associated liquid input connection 10. The liquid inlet port 10 is connected directly or switchably to the liquid outlet port 12. Oil that flows through the underwater hose to the liquid inlet connection 10 of the buoy 4 can then be pumped through the liquid outlet connection 12 and the floating hose 6 coupled to it. The second end 20 of the floating hose 6 can be coupled to a floating tanker (i.e. a ship designed as a tanker) into which the oil can flow. However, the floating tanker is not permanently coupled to the second end 20 of the floating hose 6. As soon as the tanks of the floating tanker are full, the second end 20 of the floating hose 6 is decoupled from the floating tanker so that the floating tanker can call at a port. In the time the swimming hose 6 with the free, second end 20 floats on the sea. In stormy weather and a correspondingly high swell, the floating hose 6 may overlap in a loop. Reconnecting the floating tanker to the second end of the floating hose is then difficult, if not impossible. In order to be informed before the arrival of the floating tanker whether the floating hose 6 can be connected to the floating tanker without any problems, it is intended that the system 2 has a plurality of node units 18.

The plurality of node units 18 are attached to the floating hose 6 and preferably the buoy 4 in such a way that the node units 18 are distributed between the buoy 4 and the second end 20 of the floating hose 6. For example, it may be provided that a node unit 18, designated as main unit 40, is attached to buoy 4. Another node unit 18 may be designated as first node unit 42, which is attached to the end of the first hose segment 8 facing away from buoy 4. The same can apply to each of the other hose segments 8. Thus, a second node unit 44 can be provided for the second hose segment 8, a third node unit 46 for the third hose segment 8 and a fourth node unit 48 for the fourth hose segment 8. The junction units 42, 44, 46, 48 assigned to the hose segments 8 can be firmly attached to the respective hose segment 8.

Each of the node units 18 is designed by means of an associated radio unit to establish a radio link 22, 24, 26, 28 to each of at least two of the other radio units of the respective node units 42, 44, 46, 48, so that a radio network 30, in particular a mesh radio network, is formed therefrom. An example of this is shown in FIG. 1 using node unit 18, referred to as Main Unit 40. The radio unit of the main unit 40 can establish a first radio connection 22 to the radio unit of the first node unit 42. The same applies to the second radio link 24 to the second node unit 44, the third radio link 26 to the third node unit 46 and the fourth radio link 28 to the fourth node unit 48. Signals, in particular reference signals, can be exchanged via radio links 22, 24, 26, 28. Based on the exchanged signals, the relative distances between the node units 18 can be determined. It is thus provided that each node unit 18, 40, 42, 44, 46, 48 is designed to determine a relative distance 32, 34, 36, 38 to each further node unit 42, 44, 46, 48 connected via a radio link 22, 24, 26, 28 based on the respective radio link 22, 24, 26, 28. This will be explained purely by way of example using the radio links 22, 24, 26, 28, which are shown in FIG. 1.

For example, the first radio link 22 between the Main Unit 40 and the first Node Unit 42 can be used to determine the first relative distance between the Main Unit 40 and the first Node Unit 42. The same can be provided for the second radio link 24, the third radio link 26 and the fourth radio link 28, so that the corresponding relative distance, namely the second relative distance 34, the third relative distance 36 and the fourth relative distance 38, can be determined from these. Since each of the node units 18 can establish corresponding radio links via the associated radio units, this results in a large number of radio links that allow the corresponding distances to be determined, which are then referred to as relative distances. These relative distances are suitable for determining the geometric arrangement 16 of the floating tube 6 relative to buoy 4. It is therefore intended that at least one of the node units 18 is designed as the main unit 40. In FIG. 1, this is exemplified by the node unit 18, which is attached to buoy 4. This main unit 40 is also designed to collect the relative distances determined by the other node units 42, 44, 46, 48 via radio links 22, 24, 26, 28 and/or radio network 30. In addition, based on the collected relative distances 32, 34, 36, 38, the main unit 40 is designed to determine location data representing the geometric arrangement 16 of the floating hose 6 relative to buoy 4. With these location data it is therefore possible to make a statement as to whether the floating hose 6 has, for example, a loop or another shape which prevents a floating tanker from being able to couple easily and reliably to the second end 20 of the floating hose 6, or whether the arrangement 16 of the floating hose 6 allows the floating tanker to be coupled easily and reliably to the second end 20. It is therefore envisaged that the Main Unit 40 will include a Radio Transmitter Unit 50, which is designed to wirelessly transmit a location signal representing the location data. In this context, reference is made to FIG. 2, in which System 2 is again shown schematically, although the marking of the exemplary radio links and relative distances has been omitted here.

Figure 2:
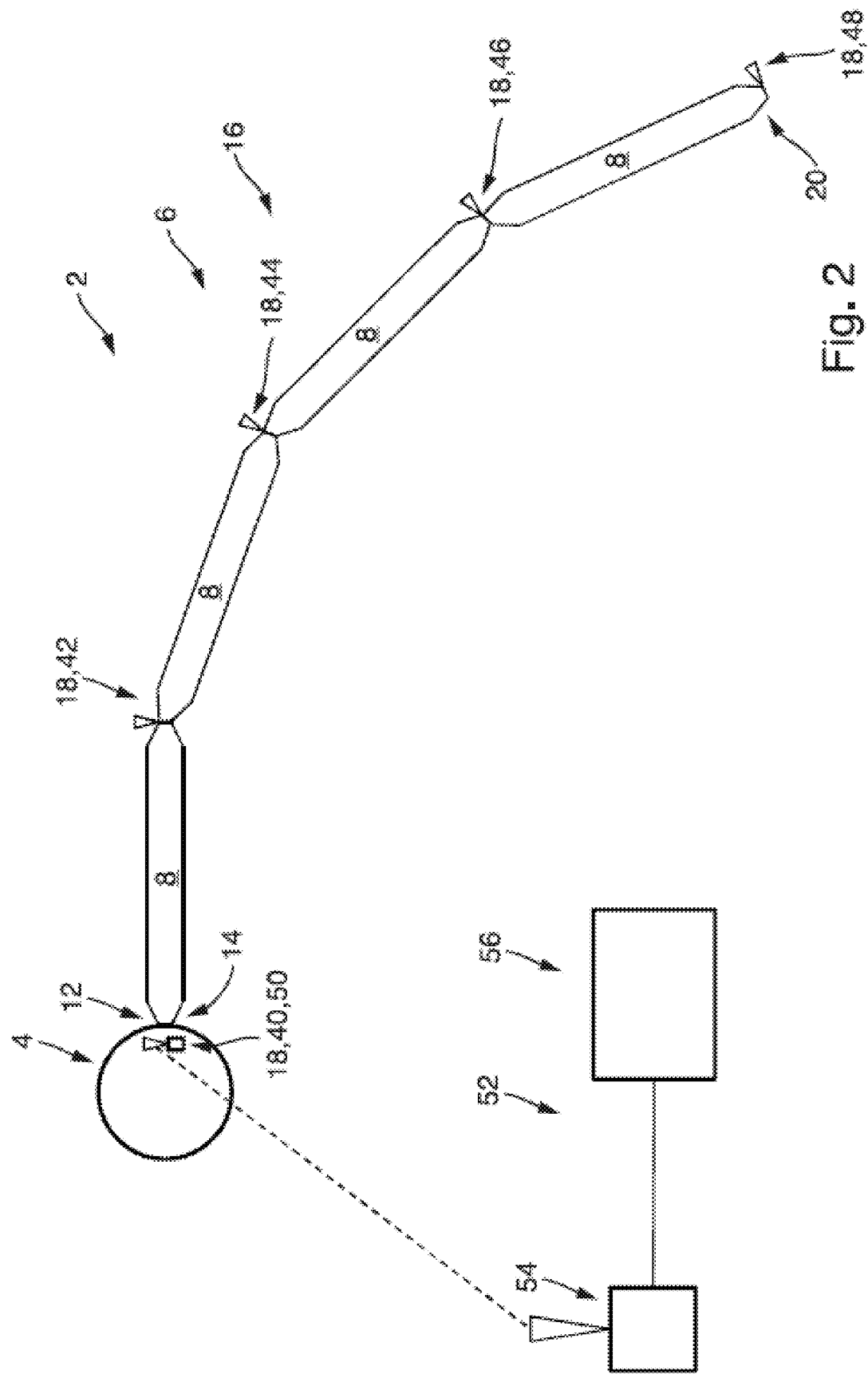
FIG. 2 shows another design of the system in a schematic view.

FIG. 2 shows a land-based base station 52, which has a radio receiver 54 designed to receive the location signal transmitted by the radio transmitter unit 50. The receiver unit 54 can be coupled with a computing unit 56 of the base station 52, so that the location data represented by the received location signal can be transmitted to the computing unit 56 by the radio receiver 54. The arithmetic unit 56 can be designed to evaluate the location data. In particular, the computing unit 56 can be configured to determine the position of the floating hose 6 relative to buoy 4 based on the location data. It has been explained above that the base station 52 is located on land. However, this is not absolutely necessary. For example, the location signal can be transmitted by means of the radio transmitter unit 50 to a satellite, which in turn transmits the location signal or a signal dependent on it via further signal transmission stations to the radio receiver 54. The radio receiver 54 can also be designed (and also called) a wired receiver if it is directly coupled to a network that can establish a signal connection to a satellite. Alternatively or in addition, the base station 52 can also be installed on a ship, especially on a floating tanker. Then the information about the arrangement of the floating hose 6 is already available on the floating tanker before it arrives at system 2.

The radio units of the node units 18 can be trained to establish radio links 22, 24, 26, 28 over a range of between 1 meter and 1000 meters. On the other hand, the radio transmitter unit 50 is preferably designed to enable the radio transmitter unit to transmit the location signal to a radio receiver 54 located more than 3000 meters away. For example, the radio transmitter unit 50 can be designed to transmit the location signal with a range of at least 10 kilometers.

Figure 3:
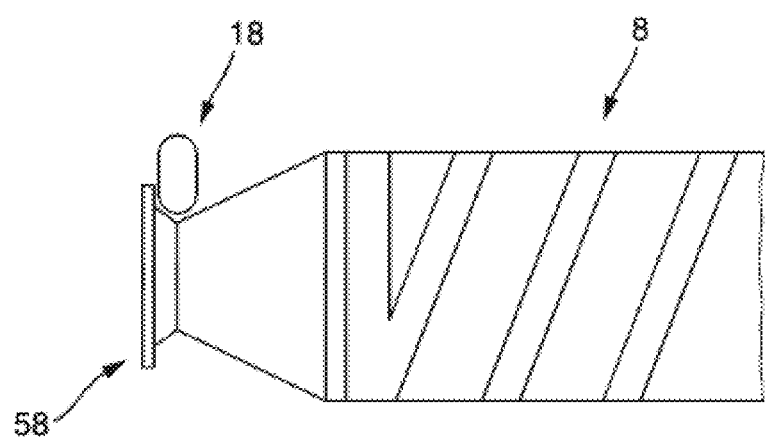
FIG. 3 shows a design of an end section of a hose segment in a schematic side view.

As can be seen schematically from the overview of FIGS. 1 and 2, the hose segments 8 are connected to each other at the front in such a way that they form the floating hose 6. Each of the hose segments 8 can have a connecting flange 58 at opposite end sections. Each connecting flange 58 is designed for detachable connection to another connecting flange 58, in particular to another hose segment 8. FIG. 3 shows a schematic diagram of an end section of a hose segment 8. This also shows the connecting flange 58 schematically. The following explanations can be applied analogously to each hose segment 8.

As can be seen schematically from FIG. 3, it is preferably intended that a junction unit 18 assigned to the hose segment 8 is arranged and/or fastened to the connecting flange 58. Thus the corresponding node unit 18 can be attached to the connecting flange 58 with a screw connection. For this purpose, the screws can be used which connect the connecting flange 58 with an oppositely arranged connecting flange 58 of another hose segment 8. It is preferred that each node unit (which can also be referred to as a knot unit) is designed to be watertight. This is of particular advantage when used in the sea, as not only the hose segments 8 but also the node units 18 are exposed to seawater. It is also preferable that each of the node units 18 has a source of energy, such as a battery, in particular a rechargeable battery. The capacity of the battery is preferably selected so that the node unit 18 can be operated for at least 18 months without changing the battery.

Figure 4:
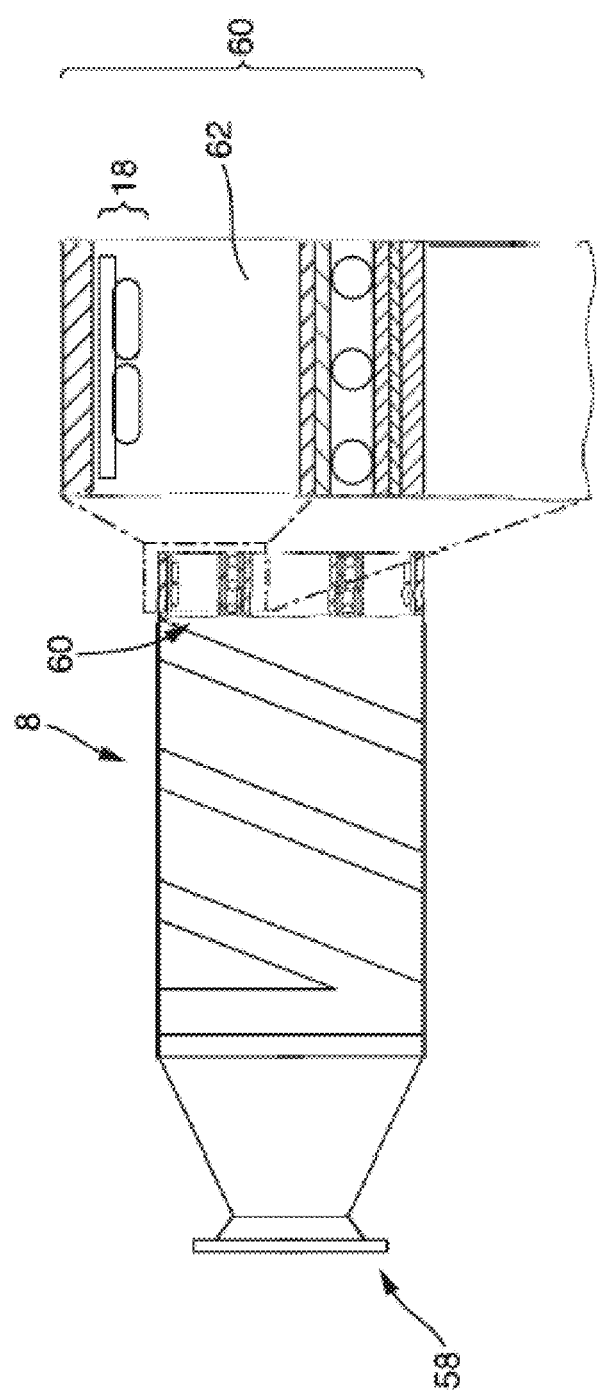
FIG. 4 shows another design of an end section of a hose segment in a schematic side view and an enlarged view of a section of the end section.

In order to better protect the node unit 18 from mechanical shocks and/or from seawater, it may be provided that the node unit 18 assigned to the hose segment 8 is embedded in the outer jacket wall 60 of the respective hose segment 8. This is shown schematically in FIG. 4 as an example. FIG. 4 shows an enlarged part of the jacket wall 60 schematically on the right side. The outer part of the jacket wall 60 often has rubber material 62, in which the respective node unit 18 can be embedded. The advantage of embedding a node unit 18 in the rubber material 62 of a hose segment 8 is that the respective node unit 18 is particularly easily and safely protected against seawater but also against mechanical shocks. However, when embedding the node unit 18 in the rubber material 62, it is preferable that a capacity of the battery of the node unit 18 is such that the node unit 18 can be operated for several years, in particular at least 5 years, without changing the battery.

Figure 5:
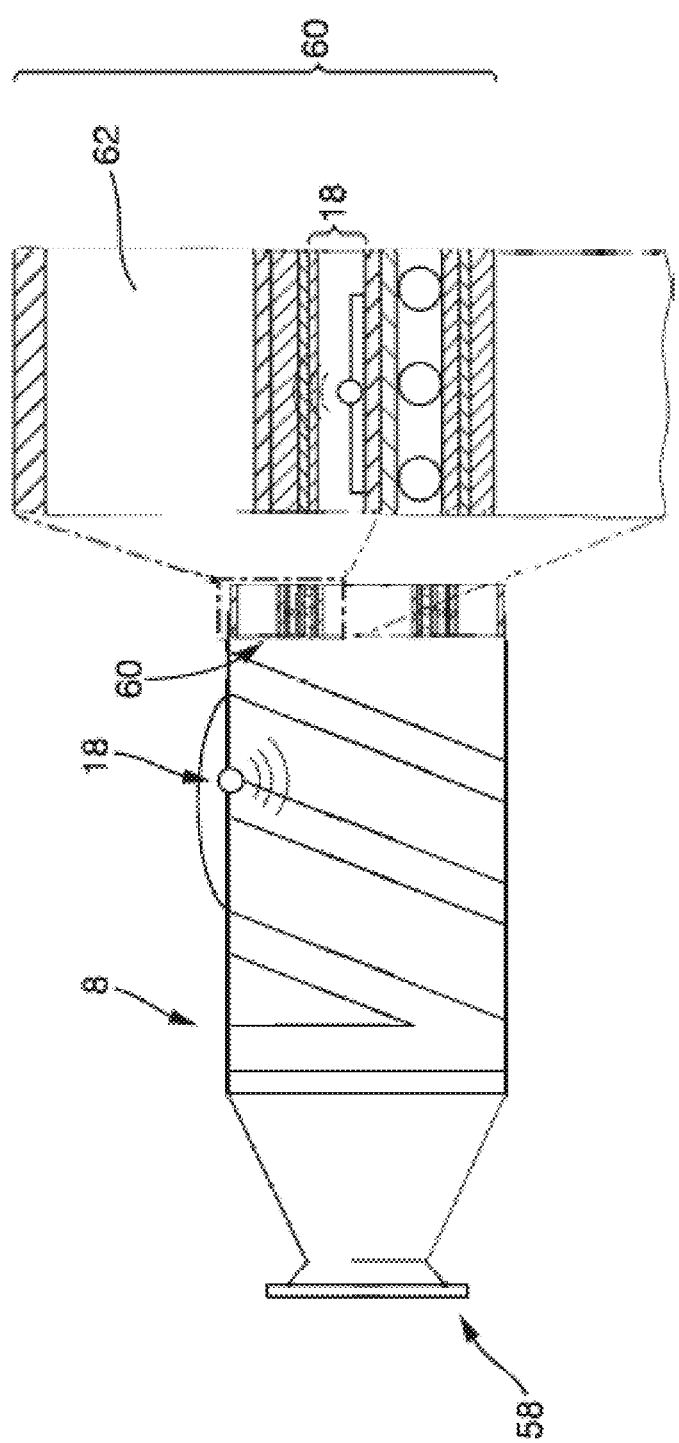
FIG. 5 shows another design of an end section of a hose segment in a schematic side view and an enlarged view of a section of the jacket wall of the end section.

As can be seen in FIG. 5 of the end section of the hose segment 8, the jacket wall 60 can be formed by several layers arranged on top of each other in the radial direction. The node unit 18 of a hose segment 8 can therefore also be arranged in a layer further inside the jacket wall 6, so that even better protection against seawater and/or mechanical shocks can be ensured.

Referring again to FIGS. 1 and/or 2, it is also noted that the Main Unit 40 may have a navigation unit designed to receive a navigation signal. In addition, the navigation unit can be designed to determine a location, in this case the location of the buoy 4. Therefore, by means of the navigation unit and the received navigation signal, further information can be added to the location data, which goes beyond the arrangement of the floating hose 6. It is preferred that the Main Unit 40 is configured to supplement the location data in such a way that the location data also represent the geographical buoy location. If this location data is now sent by means of the location signal from the radio transmitter unit 50 of the main unit 40, it can be received, for example, by the floating tanker that is on its way to system 2. Based on the received location signal, it can therefore be evaluated whether the arrangement of the floating hose 6 relative to the buoy 4 is such that a successful coupling of the floating tanker to the second end 20 of the floating hose 6 is possible. In addition, based on the geographical buoy location of buoy 4 and, moreover, the geometric arrangement of the floating hose 6 relative to buoy 4, it can be determined how the floating tanker approaches system 2 in order to effectively prevent a collision with floating hose 6.

It is appreciated that the use of the term radio can include communication using radio frequency (RF), Bluetooth, Bluetooth LE, Bluetooth smart, Long Range (LoRa) low-power wide-area network (LPWAN) technology, ultra wide bandwidth (UWB), Long Term Evolution (LTE), 4G, 5G and the like.

Another design or embodiment that can utilize the hoses with location or position sensing include is at an import terminal or an export terminal. Here, floating hose based arrangements applicable on Floating, Production, Storage and Offloading vessels (FPSOs) via a hose real or floating hose.

Another design or embodiment includes where a tanker supplies oil from the tanker, through the floating hose, through the buoy, through the underwater hose, through a PLEM and to a pipeline. The pipeline then transports the oil to, for example, an on-shore refinery. Similarly, the pipeline can transport oil from a land-based drilling operation through the PLEM, through the underwater hose, through the buoy, through the floating hose and to a tanker.

Another design or embodiment includes an application wherein the location information for the hoses is utilized to ensure that the floating hose and/or underwater hose are in a safe condition. Problematic conditions that can be identified by the circuitry include hose wrapped around the buoy, hose overlapped on itself or other object, hose bent too tightly, not in a proper or suitable working envelope (2 or 3D or axis envelope), and the like.

It is appreciated that I-nodes can utilize GPS functionality.

It is also appreciated that the hoses have suitable lengths. Some examples of typical lengths include 30 feet (9.1 meters), 35 feet (10.7 meters), and 40 feet (12.2 meters).

It is appreciated that the relative distances can be utilizes to determine a bend or bentness of the hoses described herein.

Figure 6:
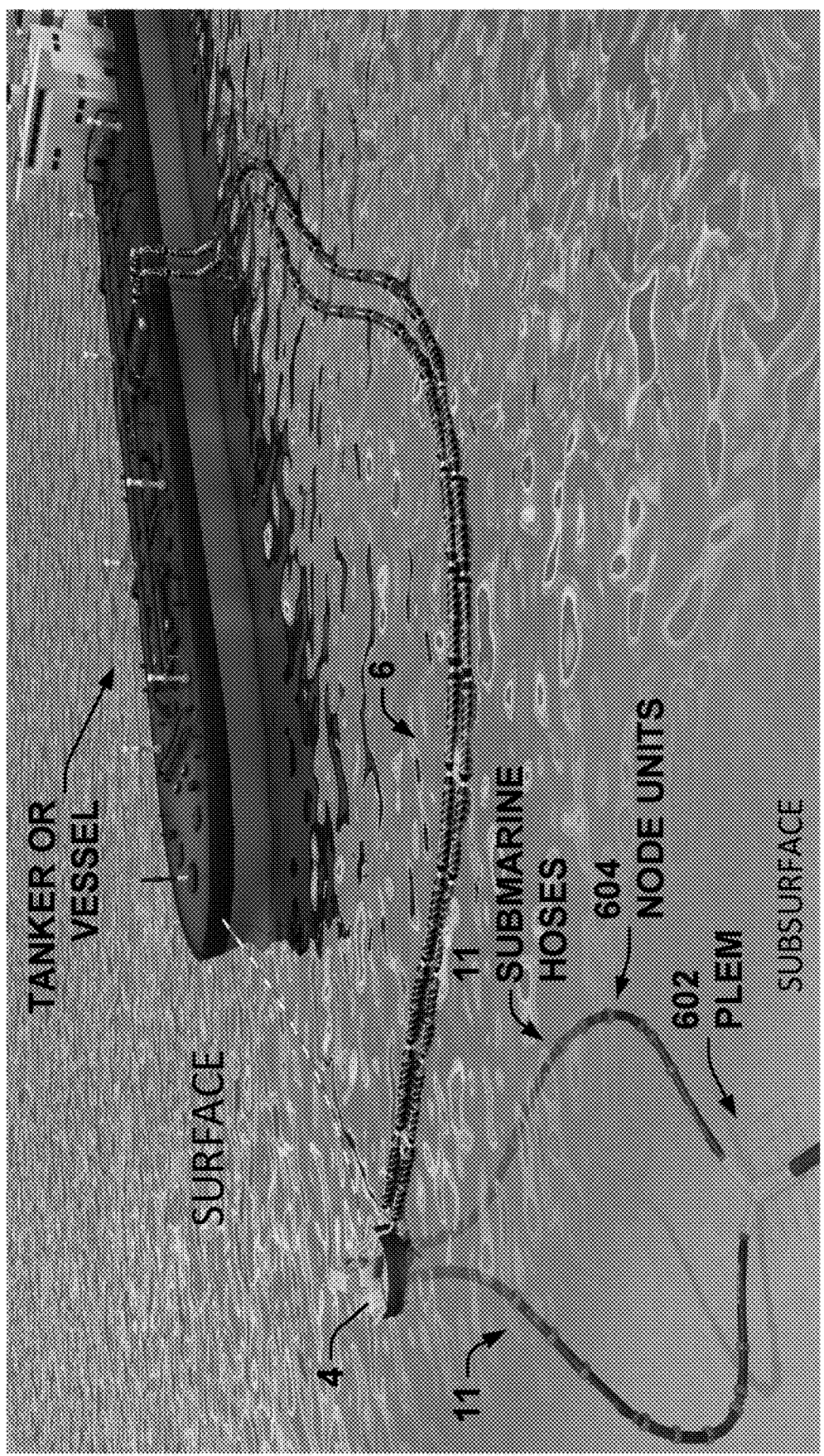
FIG. 6 is a diagram illustrating a fluid transfer system in accordance with one or more embodiments

FIG. 6 is a diagram illustrating a fluid transfer system 600 in accordance with one or more embodiments. The system 600 includes location sensing for underwater hoses and the like used for fluid transport. The system 600 is provided for illustrative purposes and it is appreciated that suitable variations are contemplated.

The system 600 can also be the system 2, described above. Thus, the description of the system 2 can be referenced for additional description.

Generally, underwater hoses, also referred to as subsea hoses, are subject to damage and/or failure due to weather conditions, mooring lines, and the like. Approaches to identify damaged and/or locate underwater hoses include diving operations. Such operations are expensive, have safety concerns and are not possible during bad weather. Further, these approaches are intermittent.

The system 600 permits continuous monitoring of underwater hoses that includes location information.

The system 600 includes a buoy 4, a buoyant floating hose 6 and one or more underwater hoses 11. The floating hose 6 is connectable to a tanker and the like for sending and/or receiving fluid, such as oil. The floating hose 6 transfers fluid via the buoy 4 from/to the underwater hoses 11.

The underwater hoses 11 are configured to transfer fluid between the buoy 4 at a first end and a second end. In this example, a pipeline end manifold (PLEM) or pipeline end termination (PLET) system 602 is connected to the second end of the underwater hoses 11.

The underwater hoses 11 include underwater node units that generate or transmit signals including, but not limited to, acoustic signals, radio signals and optical signals to the main unit 40 at the hub. The main unit 40 is configured to determine position information and the like for the underwater hoses 11 based on the acoustic signals.

The system 600 can remotely monitor relative position of submarine or underwater hoses (passive system) and provide warnings when hose string is in potentially 'dangerous' position which may lead to damage.

The system 600 can be employed for hose applications where the position of the hose is of interest to the operator—for example dredging, deep sea mining, sea water intake systems and the like.

Further, the system 600, such as circuitry in the node units or elsewhere, can be configured to monitor the relative position of the underwater hoses to identify problematic conditions, described above.

Figure 7:
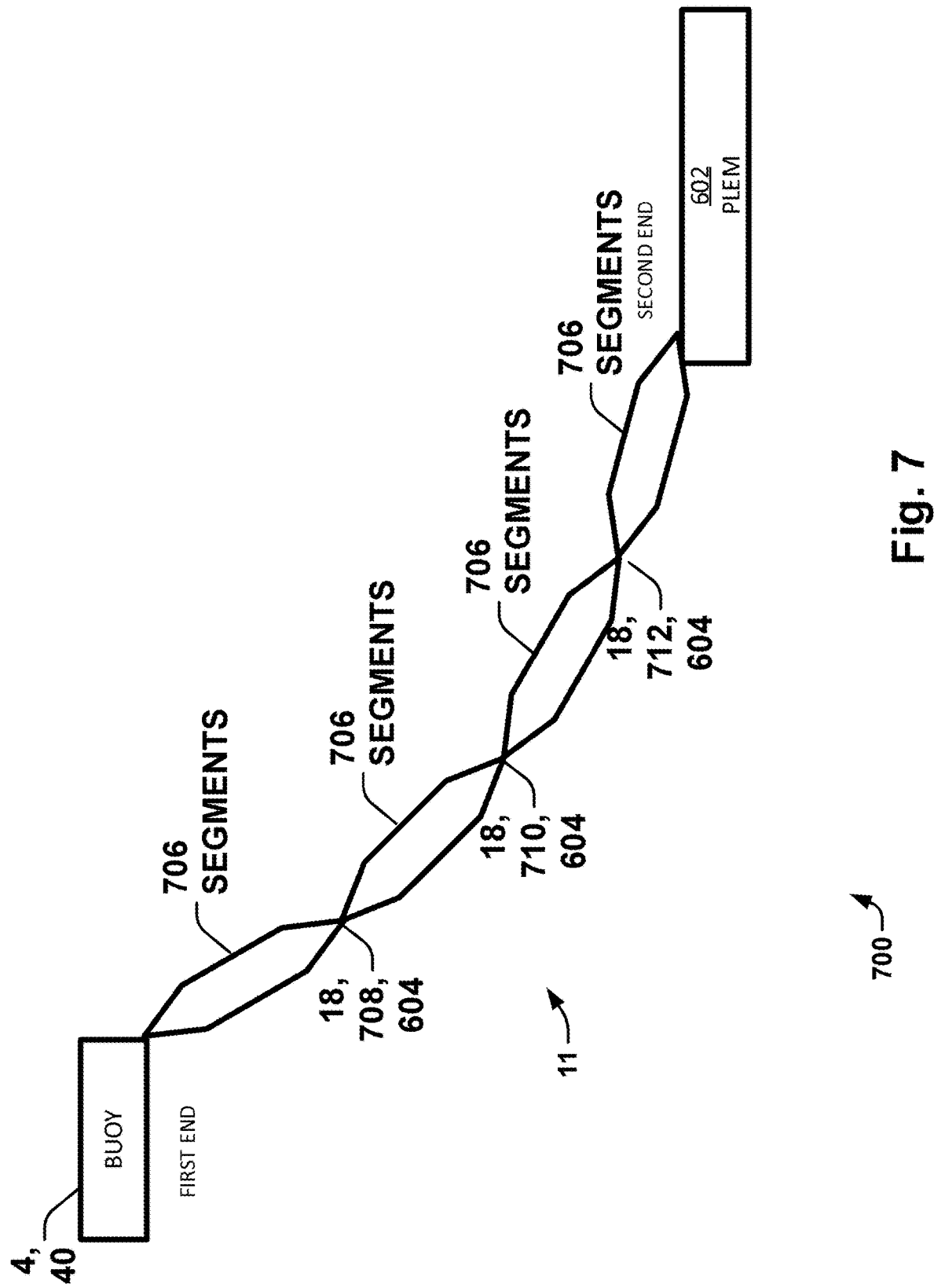
FIG. 7 is a diagram illustrating an underwater/subsea portion of the system 600 in accordance with one or more embodiments.

FIG. 7 is a diagram illustrating an underwater/subsea portion 700 of the system 600 in accordance with one or more embodiments. The portion 700 is provided for illustrative purposes and it is appreciated that suitable variations are contemplated.

Wireless subsea communications technology is applied to monitor the position of the underwater hoses 11, also referred to as submarine hoses, using acoustic, radio, optical solutions. For example, Ultrashort Baseline (USBL) subsea acoustic technology can be applied utilizing a transceiver (e.g., at the buoy) and one or more transponders (can be located with the node units). The transceiver generates and transmits an acoustic pulse detected by the one or more transponders, which replies with its own acoustic pulse. This return pulse is then detected by the transceiver. The time from transmission of the pulse to receiving the return pulse can be used to determine position/range and an angle. It is appreciated that other suitable technologies can be utilized.

The underwater hoses 11 are shown in additional detail. The hoses 11 include a plurality of segments 706, which can be connected similar to the segments 8 of the floating hose 6, described above.

Undersea node units 18, 604 are located along the length of the hoses 11 and interact with the main unit 40 to generate position/location information. The system 600 is provided for illustrative purposes and it is appreciated that suitable variations are contemplated. This interaction can be in the form of acoustic signals, radio signals and the like.

The undersea node units 18, 604 can be positioned or attached to the segments 706 using a suitable technique. In one example, the node units 18, 604 are bolted onto segments 706. In another example, the node units 18, 604 are integrated in to the segments 706 and/or the hoses 11.

The undersea node units 18, 604 can be powered via battery power. For example, each node can include a battery that supplies power.

A first undersea node unit 708 interacts with the main unit 40 to determine a first relative distance.

A second undersea node unit 710 interacts with the main unit 40 to determine a second relative distance.

A third undersea node unit 712 interacts with the main unit 40 to determine a third relative distance.

The main unit 40 is configured to interact with additional nodes to determine additional relative distances.

It is also appreciated that the plurality of node units 18, 604 can communicate with each other using suitable communication techniques such as mesh network style and the like.

Circuitry can be configured to determine the relative distances and then determine a geometric arrangement for the undersea hoses based on the determined relative distances. The circuitry can be located, for example, in the main unit 40 and/or the node units 604.

Wireless nodes 604, 18 are located along the length of the submarine hose string 11 and are configured to provide snapshot relative location data of each node on a regular basis. This resulting formation or information can then be transmitted through water using 'Ultra Short Baseline' (USBL) subsea acoustic communication by the main unit 40, and then up to the surface, and from there wirelessly back to shore via satellite/cellular/other.

Position data history (along with hose data/maintenance data etc) and the like can be stored remotely in a cloud, data storage, and/or other suitable device and can be accessed by operators on shore/remotely through a secure customer portal.

Active warning signals can be generated when the hose position is considered to be in a 'dangerous' state outside of normal working position envelope also automatically sent out through email/SMS/phone communications. This then allows the operators to react to live data remotely.

The nodes 18, 604 can be configured to communicate wirelessly with each other up to the surface whereby linked to a central 'hub', such as the main unit 40, to process the data and compress to allow for onward wireless transmission of data into cloud and communication though online secure portal to customers/OEs and the like.

Figure 8:
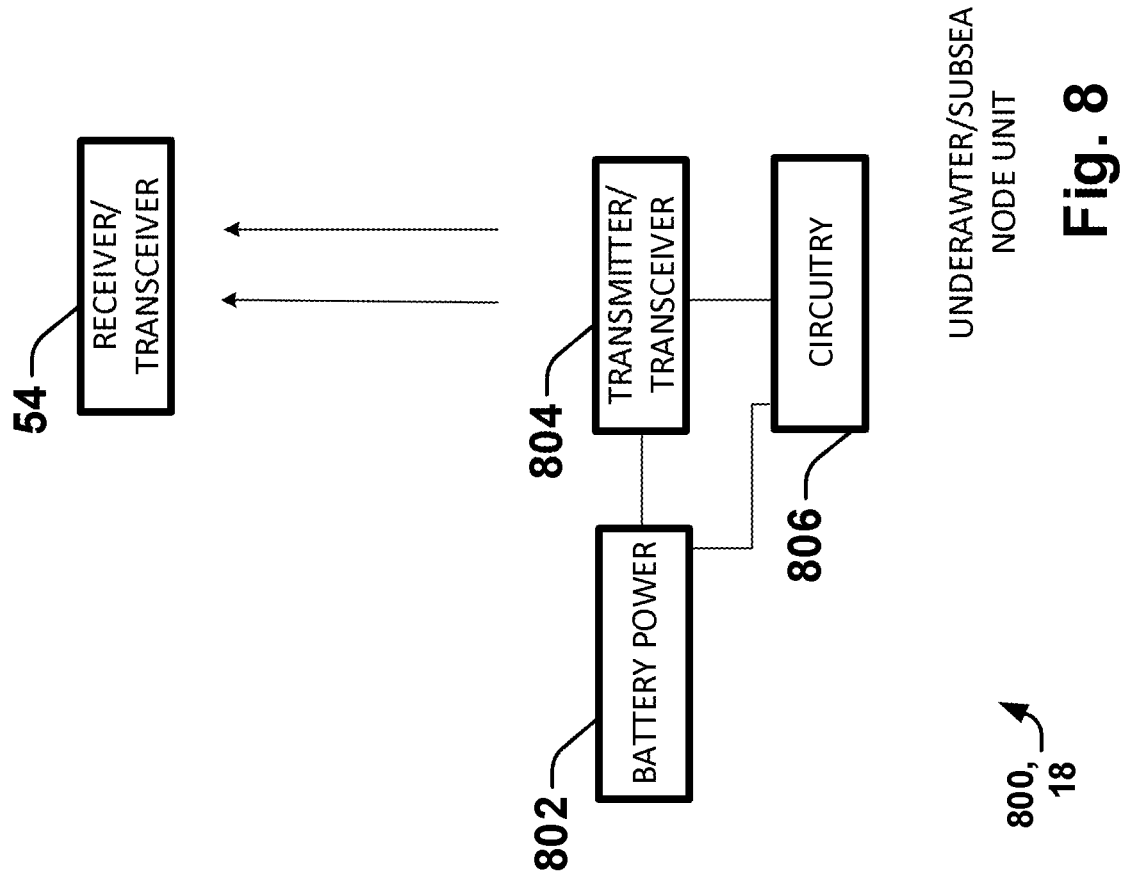
FIG. 8 is a diagram illustrating an example of a suitable undersea node unit 800 in accordance with one or more embodiments.

FIG. 8 is a diagram illustrating an example of a suitable undersea node unit 800 in accordance with one or more embodiments. The unit 800 is provided for illustrative purposes and it is appreciated that suitable variations are contemplated.

The unit 800, 18 includes a power source 802, a transmitter 804, and circuitry 806. The unit 800, 18 can be used with the system 600, 2 and variations thereof to facilitate underwater location sensing or determination.

The power source 802 is a battery power source in one example.

The transmitter 804 is configured to generate signals for location sensing, such as radio signals, acoustic signals and the like. The transmitter 804 can include radio frequency circuitry, modulators and the like to facilitate signal generation. Further, the transmitter 804 can also be part of a transceiver so that signals can be sent and received.

The circuitry 806 is connected to the power 802 and the transmitter 804 and is configured to generate the signals for location sensing, which are received by the receiver 54 of the main unit 40 or buoy 4. Additionally, the circuitry 806 can be configured to communicate with the receiver 54 so that the relative position of the node 800 can be communicated.

Figure 9:
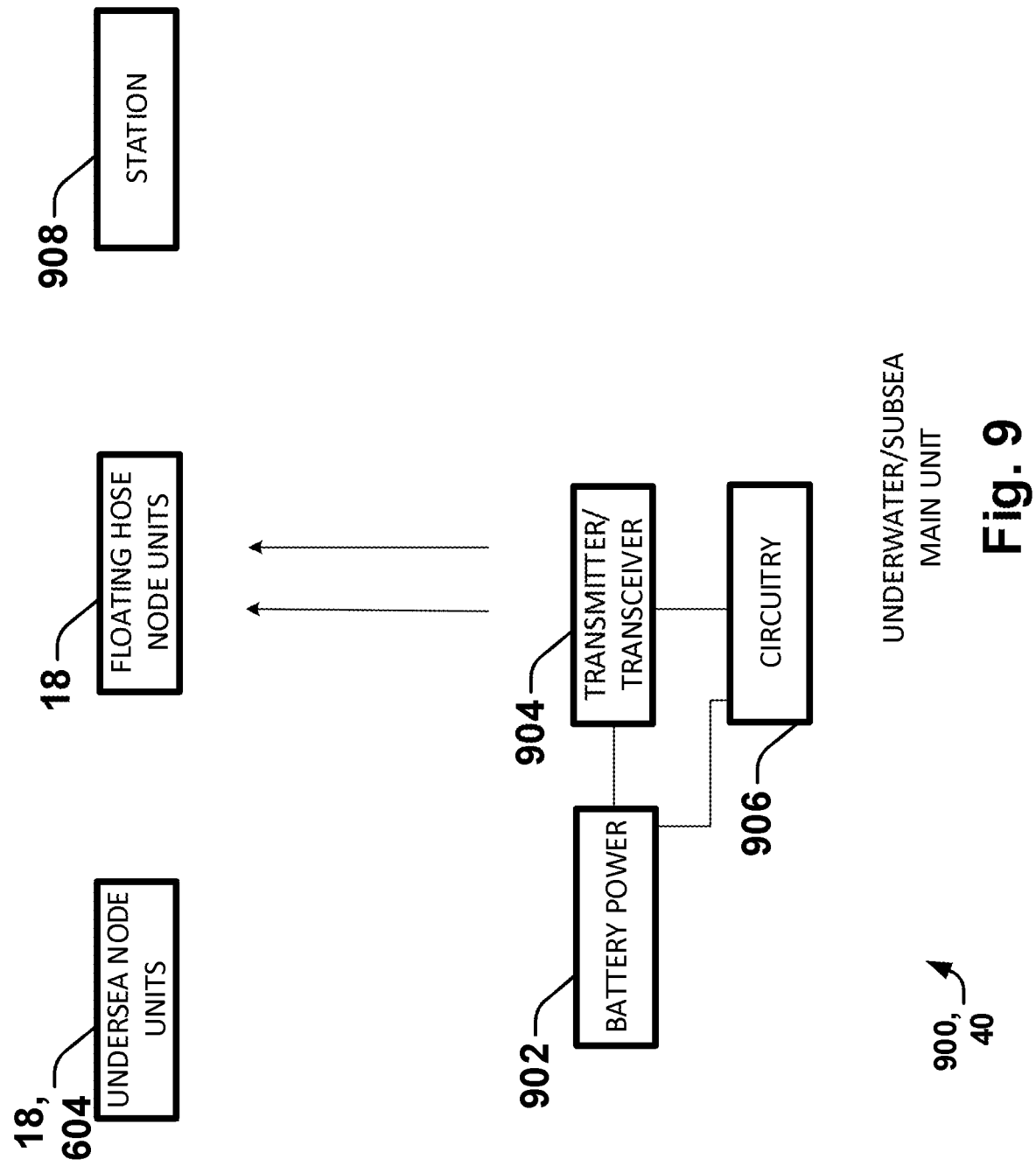
FIG. 9 is a diagram illustrating an example implementation of a main unit 900, 40 for floating hose and/or underwater hose fluid transfer applications in accordance with one or more embodiments.

FIG. 9 is a diagram illustrating an example implementation of a main unit 900, 40 for floating hose and/or underwater hose fluid transfer applications in accordance with one or more embodiments.

The main unit 900, 40 is located, in this example, on the buoy 4. However it is appreciated that other suitable locations of the main unit 900, 40 are contemplated.

The main unit 900, 40 interacts and/or communicates with undersea node units 18, 604, floating hose node units 18, and one or more stations 908.

The main unit 900, 40 includes a power source 902, a transmitter 904, and circuitry 906. The unit 900, 40 can be used with the system 600, 2 and variations thereof to facilitate underwater hose location and/or floating hose location sensing or determination.

The power source 902 is a battery power source in one example.

The transmitter 904 is configured to generate signals for location sensing, such as radio signals, acoustic signals and the like. The transmitter 904 can include radio frequency circuitry, modulators and the like to facilitate signal generation. Further, the transmitter 904 can also be part of a transceiver so that signals can be sent and received.

The circuitry 906 is connected to the power 902 and the transmitter 904 and is configured to receive the signals for location sensing from the undersea node units 18, 604 and the floating hose node units 18.

The circuitry 906 can be configured to determine relative distances to the undersea node units 18, 604 and the floating hose node units 18. Further, the circuitry can be configured to generate geometric arrangements for underwater hoses 11 and floating hoses 6 based on the determined relative distances.

Additionally, the circuitry 806 can be configured to communicate with the one or more stations 908. The communicated information includes relative distances, geometric arrangements, hose location/positioning, warnings, maintenance advisories and the like.

The one or more stations can include vessels, oil platforms, ground stations and the like.

Figure 10:
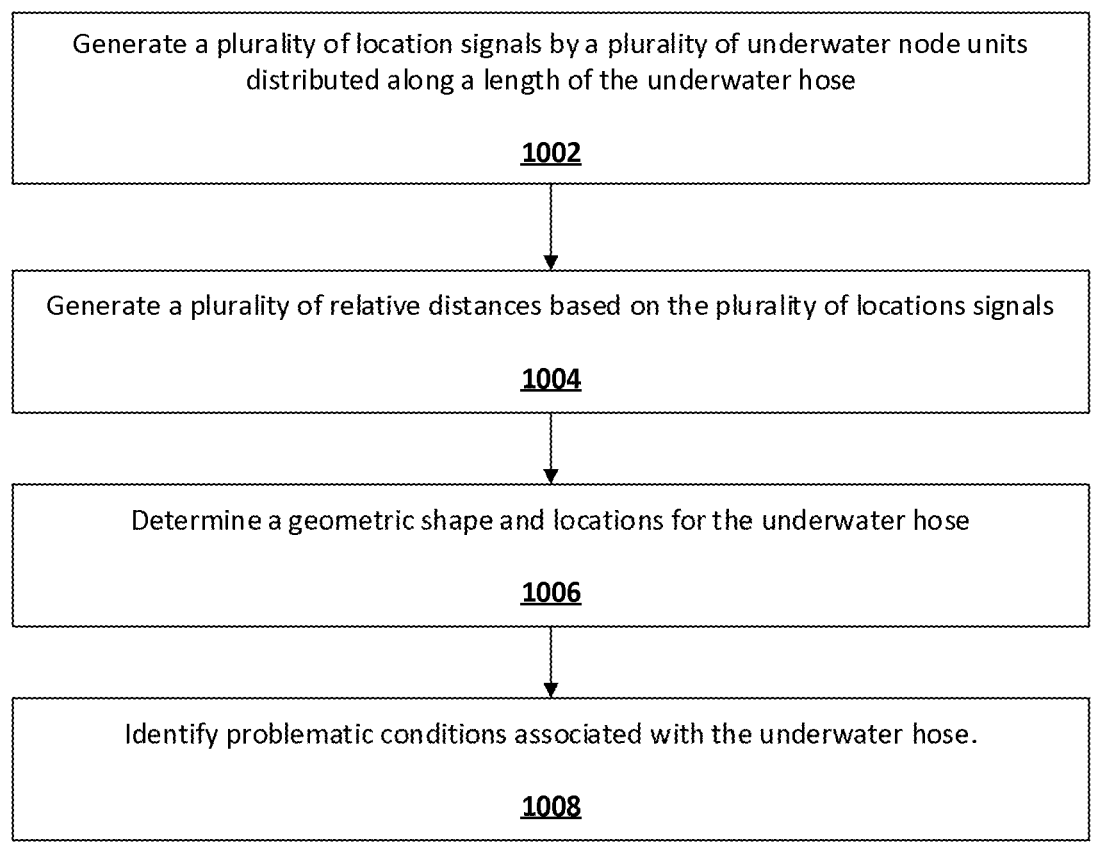
FIG. 10 is a flow diagram illustrating a method in accordance with one or more embodiments.

FIG. 10 is a flow diagram illustrating a method 1000 in accordance with one or more embodiments. The method 1000 can be performed using the systems described above, such as system 2 and system 600. Further, it is appreciated that the method can include additional blocks or steps and omit recited steps in suitable variations of the method 1000.

The method 1000 is directed to an underwater hose for fluid transfer.

A plurality of location signals are generated by a plurality of underwater node units distributed along a length of the underwater hose at block 1002.

A plurality of relative distances based on the plurality of locations signals are generated at block 1004.

A geometric shape and locations for the underwater hose is/are determined at block 1006.

Problematic conditions associated with the underwater hose are identified at block 1008.

The method 1000 can also transmit the identified problematic conditions to a land based station, tanker, oil platform, and the like.

The method 1000 can also adjust flow of fluid through the underwater hose based on the identified problematic conditions. For example, if a hose segment is bent too sharply, the method 1000 can stop transfer of fluid through the underwater hose. As another example, if there are no identified problematic conditions transfer of fluid through the underwater hose can begin and/or continue.

REFERENCE CHARACTER LIST (PART OF THE DESCRIPTION)

2 System
4 Buoy
6 Swim hose
8 Hose segment
10 Liquid inlet connection
11 Underwater hose
12 Liquid outlet connection
14 first end
16 Arrangement
18 Node unit
20 second end
22 first radio contact
24 second radio connection
26 third radio link
28 fourth radio link
30 Radio network
32 first relative distance
34 second relative distance
36 third relative distance
38 fourth relative distance
40 Main unit
42 first node device
44 second node device
46 third node unit
48 fourth node unit
50 Radio transmitter unit
52 Base station
54 Radio receiver
56 Unit of account
58 Connection flange
60 Sheath wall
62 Rubber material It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One general aspect includes an underwater hose system for fluid transfer. The underwater hose system also includes a floatable buoy. The system also includes an underwater hose having a first end coupled to the floatable buoy and a second end. The system also includes a plurality of underwater node units distributed along the length of the underwater hose and configured to generate positioning signals. The system also includes circuitry configured to determine a relative distance between each of the plurality of underwater node units based on the generated positioning signals to generate a plurality of relative distances.

Implementations may include one or more of the following features. The system may include a main unit configured to collect the plurality of relative distances and determine location based information for the underwater hose. The system may include a floating hose coupled to the floatable buoy and having a plurality of floating hose node units distributed along its length. The circuitry is further configured to determine a relative distance between each of the plurality of floating hose node units. The underwater hose includes a plurality of segments removably attached to each other. The second end of the underwater hose is attached to a plem on a sea bed. The plurality of underwater node units may include a transmitter configured to generate acoustic signals as the generated positioning signals. The plurality of underwater node units are configured to transmit the plurality of relative distances. The circuitry is configured to transmit location information for the underwater hose to a station. The first end is connected to a floatable buoy. The first end is connected to a platform. The relative distances are in three dimensions (3d) x, y and z. The plurality of underwater node units may include a transmitter configured to generate at least one of optical signals and radio signals as the generated positioning signals. The generated plurality of relative distances facilitate transfer of fluid from a seabed at the second end to a surface element at the first end.

One general aspect includes an underwater hose system for fluid transfer. The underwater hose system also includes an underwater hose having a first end connected to a port at a surface and a second end connected to a PLEM. The system also includes a plurality of underwater node units distributed along the length of the underwater hose and configured to generate positioning signals. The system also includes circuitry configured to determine a relative distance between each of the plurality of underwater node units based on the generated positioning signals to generate a plurality of relative distances.

Implementations may include one or more of the following features. The system where the port is an output port that receives oil from a tanker and the oil flows through the underwater hose, through the PLEM and to a land based pipeline. The port is an inlet port and oil flows from a land based drilling platform to the PLEM, through the underwater hose and to a tanker via the inlet port.

One general aspect includes a method of operating an underwater hose for fluid transfer. The method of operating also includes generating a plurality of location signals by a plurality of underwater node units distributed along a length of the underwater hose. The operating also includes generating a plurality of relative distances based on the plurality of locations signals. The operating also includes determining a geometric shape and locations for the underwater hose. The operating also includes identifying problematic conditions associated with the underwater hose.

Implementations may include one or more of the following features. The method may include transmitting the identified problematic conditions to a land based station. The method may include stopping transfer of oil through the underwater hose based on the identified problematic conditions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An underwater hose system for fluid transfer, the system comprising:
a floatable buoy, and an underwater hose having a first end coupled to the floatable buoy and a second end;
a plurality of underwater node units distributed along a length of the underwater hose and configured to generate positioning signals; and
circuitry configured to determine a relative distance between each of the plurality of underwater node units based on the generated positioning signals to generate a plurality of relative distances.

2. The system of claim 1, further comprising a main unit configured to collect the plurality of relative distances and determine location based information for the underwater hose.

3. The system of claim 1, further comprising a floating hose coupled to the floatable buoy and having a plurality of floating hose node units distributed along its length.

4. The system of claim 3, wherein the circuitry is further configured to determine a relative distance between each of the plurality of floating hose node units.

5. The system of claim 1, wherein the underwater hose includes a plurality of segments removably attached to each other.

6. The system of claim 1, wherein the second end of the underwater hose is attached to a pipeline end manifold (PLEM) on a sea bed.

7. The system of claim 1, wherein the plurality of underwater node units comprise a transmitter configured to generate acoustic signals as the generated positioning signals.

8. The system of claim 1, wherein the plurality of underwater node units are configured to transmit the plurality of relative distances.

9. The system of claim 1, wherein the circuitry is configured to transmit location information for the underwater hose to a station.

10. The system of claim 1, wherein the first end is connected to another floatable buoy.

11. The system of claim 1, wherein the first end is connected to a platform.

12. The system of claim 1, wherein the relative distances are in three dimensions (3D) x, y and z.

13. The system of claim 1, wherein the plurality of underwater node units comprise a transmitter configured to generate at least one of optical signals and radio signals as the generated positioning signals.

14. The system of claim 1, wherein the generated plurality of relative distances facilitate transfer of fluid from a seabed at the second end to a surface element at the first end.

15. An underwater hose system for fluid transfer, the system comprising:
an underwater hose having a first end connected to a port at a surface and a second end connected to a pipeline end manifold (PLEM);
a plurality of underwater node units distributed along a length of the underwater hose and configured to generate positioning signals; and
circuitry configured to determine a relative distance between each of the plurality of underwater node units based on the generated positioning signals to generate a plurality of relative distances.

16. The system of claim 15, wherein the port is an output port that receives oil from a tanker and the oil flows through the underwater hose, through the PLEM and to a land based pipeline.

17. The system of claim 16, wherein the port is an inlet port and oil flows from a land based drilling platform to the PLEM, through the underwater hose and to a tanker via the inlet port.

18. A method of operating an underwater hose for fluid transfer, the method comprising:
generating a plurality of location signals by a plurality of underwater node units distributed along a length of the underwater hose;
generating a plurality of relative distances based on the plurality of locations signals;
determining a geometric shape and locations for the underwater hose; and
identifying problematic conditions associated with the underwater hose.

19. The method of claim 18, further comprising transmitting the identified problematic conditions to a land based station.

20. The method of claim 18, further comprising stopping transfer of oil through the underwater hose based on the identified problematic conditions.

* * * * *